C. HENDERSON.
Nut-Lock.

No. 168,489.　　　　　　　　　　　Patented Oct. 5, 1875.

Witnesses:
Edw. W. Donn
A. C. Rawlings.

Inventor:
Cyrus Henderson
By W. C. Donn
His Attorney

UNITED STATES PATENT OFFICE.

CYRUS HENDERSON, OF WESTMORELAND COUNTY, PENNSYLVANIA.

IMPROVEMENT IN NUT-LOCKS.

Specification forming part of Letters Patent No. 168,489, dated October 5, 1875; application filed May 10, 1875.

*To all whom it may concern:*

Be it known that I, CYRUS HENDERSON, of the county of Westmoreland and State of Pennsylvania, have invented a new and Improved Lock-Nut, of which the following is a specification:

The object of my invention is a nut which, when screwed upon the bolt, will not by jar or friction become unscrewed, but remain fast or locked on the bolt, and can also be easily removed when it is desired to disconnect the parts connected by said nut and bolt. This I accomplish by the combination of a screw-bolt having one or more slots or grooves cut along its length, and a nut constructed with a head and a round or circular body, having a screw-thread cut round the outside of the body, and also one inside of body and head; also, having one or more slots or recesses cut longitudinally through the body; one or more keys, which fit said slots of both nut and bolt; a cap-nut, which corresponds to, and screws on, the body of the slotted nut, having also a shoulder inside; washers of various thicknesses—all of which are shown in detail in the accompanying drawings, which are hereby made a part of this specification—

Figure 1:
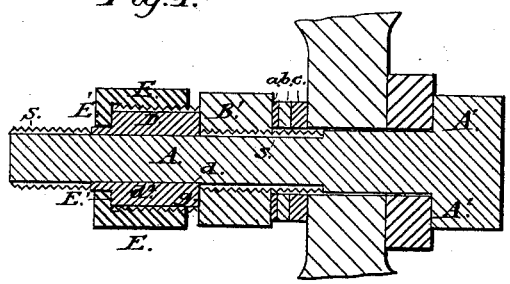
Figure 2:
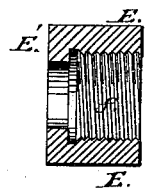
Figure 3:
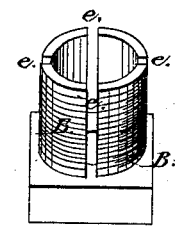
Figure 4:
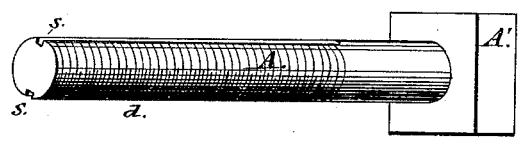
Figure 5:

Figure 1 being a longitudinal section of the invention, the various parts all being in proper relation the one to the other. Figs. 2, 3, 4, and 5 show the different parts separate.

A is the bolt, A′ A′ being the head; $s\ s$, the slots or grooves; $d$, the screw-thread. B is the body of the slotted nut, B′ B′ being the head of the nut; $d^2$, the inner and $g$ the outer screw-thread; $e\ e\ e\ e$, Fig. 3, the slots or recesses. D is one of the keys. E is the cap-nut, $f$ being the screw-thread, and E′ E′ the shoulders. $a\ b\ c$, Fig. 1, show the washers.

The operation of my invention is as follows: The bolt A is first passed through the parts it is to hold together. One or more washers, $a\ b\ c$, of various thicknesses, are then placed on the bolt-pin A. The slotted nut B is then screwed up and jammed against the washers $a\ b\ c$, so that two of the slots $e\ e$ will come opposite to, or nearly even with, the slots $s\ s$ in the bolt A. (This is regulated by either increasing or decreasing the thickness or the number of the washers.) Two keys, D, are then placed in the slots, and prevent the further movement of the slotted nut B on the bolt A. The cap-nut E is then screwed on the body of the slotted nut B until the shoulders E′ E′ come in contact with and jam against the end of the keys D and body of the slotted nut B.

Having thus described my invention and its operation, what I claim as my invention, and desire Letters Patent for, is—

The cap-nut E, slotted nut B, and keys D, in combination with the bolt A, having grooves $s\ s$, substantially as herein described and set forth.

CYRUS HENDERSON.

Witnesses:
WM. M. CUTHBERT,
WM. E. PLOSS.